United States Patent [19]

Everett

[11] Patent Number: 5,186,305

[45] Date of Patent: Feb. 16, 1993

[54] APPARATUS AND METHODS FOR FEEDING CONTAINER CROWNS AND SIMILAR ARTICLES AT HIGH THROUGH-PUT RATES

[75] Inventor: George Everett, Orlando, Fla.

[73] Assignee: Rollason Engineering & Mfg., Inc., Fern Park, Fla.

[21] Appl. No.: 813,352

[22] Filed: Dec. 24, 1991

[51] Int. Cl.$^5$ ............................................. B65G 47/24
[52] U.S. Cl. .................................... 198/392; 198/400; 198/454
[58] Field of Search ............... 198/392, 400, 454, 455; 193/46

[56] References Cited

U.S. PATENT DOCUMENTS

| | | |
|---|---|---|
| 2,505,398 | 4/1950 | Harris ..................................... 193/46 |
| 2,745,537 | 5/1956 | Cadman . |
| 2,772,005 | 11/1956 | Dubin et al. . |
| 3,101,832 | 8/1963 | Wyle et al. . |
| 3,305,067 | 7/1967 | Mayer . |
| 3,578,140 | 5/1971 | Myer . |
| 3,592,336 | 7/1971 | Thurston . |
| 3,623,594 | 11/1971 | Ravn . |
| 3,650,369 | 3/1972 | Vergobbi . |
| 3,706,368 | 12/1972 | Sterling .............................. 198/392 |
| 3,710,924 | 1/1973 | Schultz . |
| 3,828,921 | 8/1974 | Tackett, Jr. . |
| 3,860,145 | 1/1975 | Miller . |
| 4,006,812 | 2/1977 | Everett et al. . |
| 4,271,953 | 6/1981 | Smith . |

FOREIGN PATENT DOCUMENTS 1114037 4/1956 France .

Primary Examiner—Joseph E. Valenza
Attorney, Agent, or Firm—Allen, Dyer, Doppelt, Franjola & Milbrath

[57] ABSTRACT

The apparatus includes a generally circular table having a fence about its periphery, and is provided with a conveyor for feeding quantities of container crowns onto the table. The table is rotated so that the container crowns are moved outwardly against the fence and fed centrifugally into a twist chute for receiving the crowns. The apparatus is provided with first and second curved channels coupled for conveying containers out of the twist chutes, the second curved channel merging together with the first channel at a point along their respective paths, with the path length of the first channel being substantially longer than that of the second channel between the twist tube, twist chute and the merging point. The apparatus includes the escapement assembly, the speed of which is controlled and is operated at the merging point for controlling the rate of movement of container crowns out of the first and second channels.

39 Claims, 5 Drawing Sheets

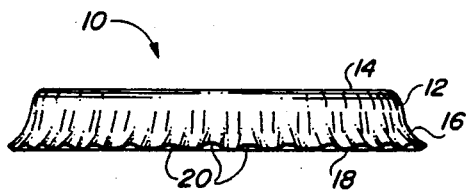
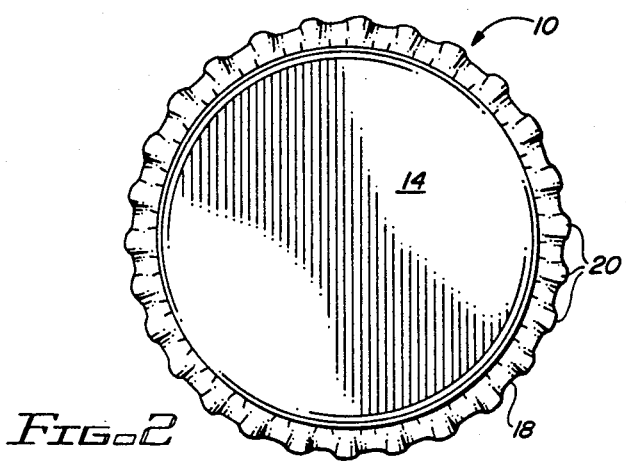
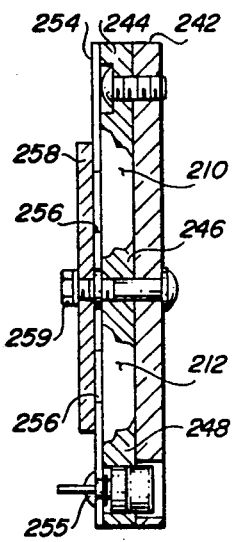
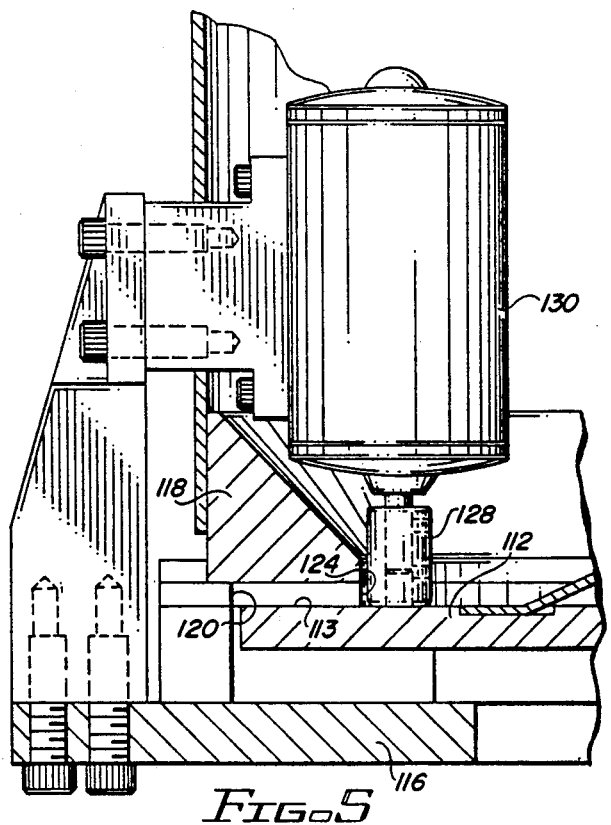
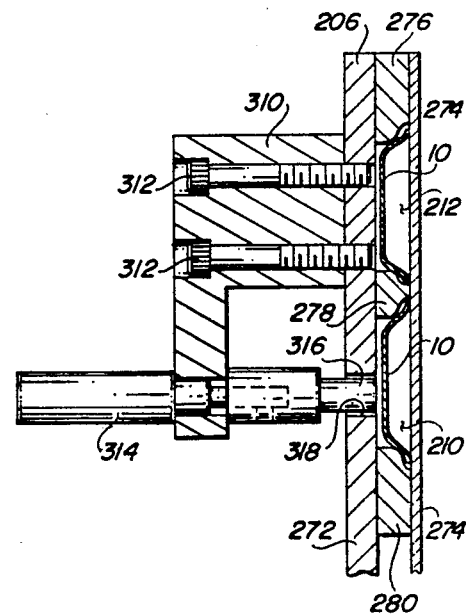

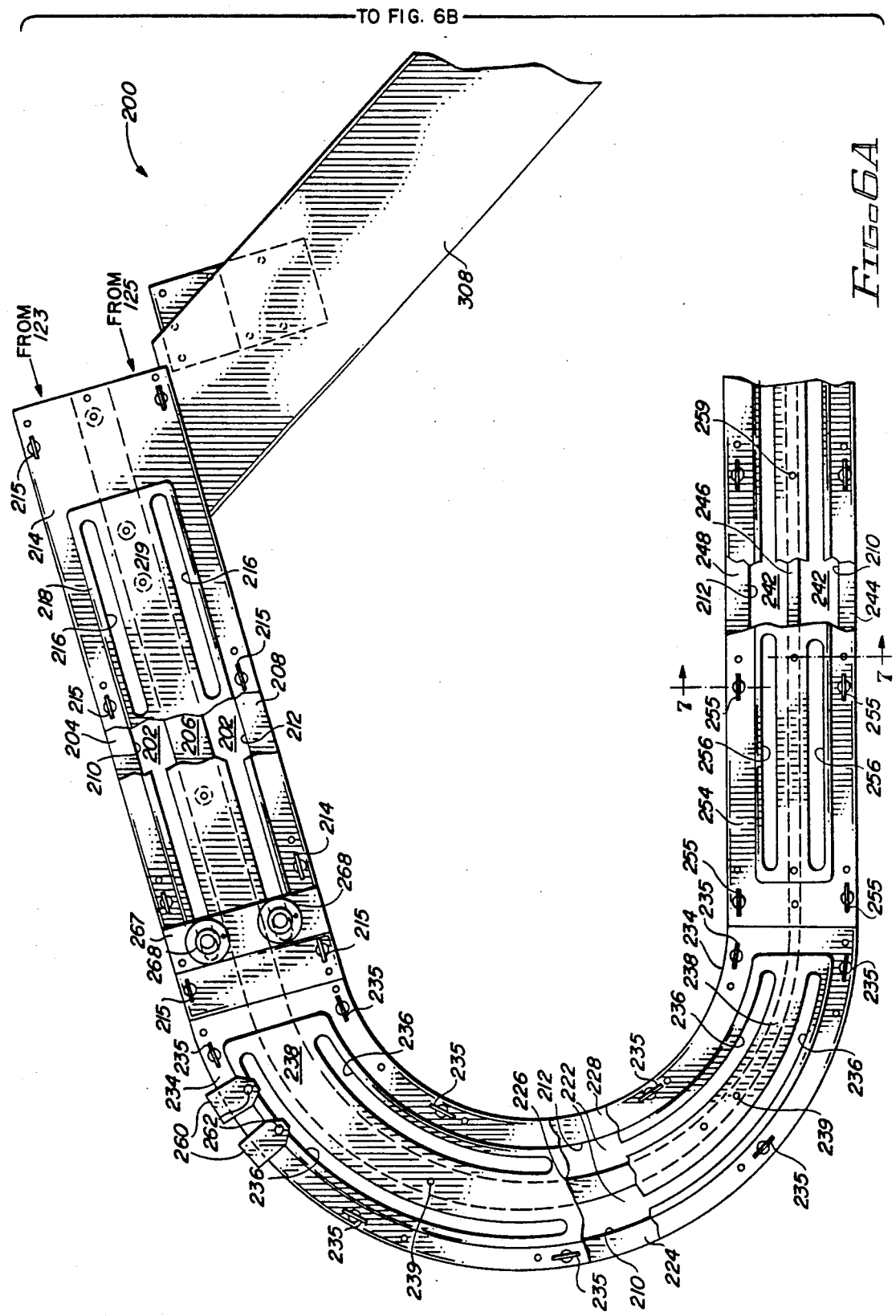

FROM FIG. 6A

APPARATUS AND METHODS FOR FEEDING CONTAINER CROWNS AND SIMILAR ARTICLES AT HIGH THROUGH-PUT RATES

BACKGROUND OF THE INVENTION

1. Field of the Invention

The present invention relates to apparatus and methods for orienting and feeding container crowns and similar articles at high rates of speed.

2. Description of the Prior Art

Container crowns typically have a corrugated, gear-like shape and tend to lock together when conveyed. In my earlier U.S. Pat. No. 4,006,812, apparatus is described for automatically orienting and feeding container crowns and similar articles into a vertical reservoir used to recirculate the crowns and reduce the locking of the crown edges. Improvements to the apparatus disclosed in that patent are set forth in U.S. Pat. No. 4,271,953 to Smith, which describes a deflecting member at the bottom of the hopper having magnetic disks along a rotating vertical surface to facilitate movement of container crowns out of the reservoir. However, the recirculation techniques described in the '812 patent is counter productive to the control of the flow of container crowns and inhibits higher rates of speed.

Other prior art of interest includes French Patent 1,114,037 which discloses a horizontal centrifugal conveyor table similar to that described in U.S. Pat. No. 4,006,812, discussed above.

Other prior art of general interest also includes the following U.S. Pat. No. 3,860,145 to Miller; U.S. Pat. No. 3,828,921 to Tackett; U.S. Pat. No. 3,710,924 to Schultz; U.S. Pat. No. 3,650,369 to Vergobbi; U.S. Pat. No. 3,623,594 to Ravn et al; U.S. Pat. No. 3,592,336 to Thurston et al; U.S. Pat. No. 3,578,140 to Myer et al; U.S. Pat. No. 3,305,067 to Mayer; 3,401,832 to Wyle et al; U.S. Pat. No. 2,772,005 to Dubin et al; and U.S. Pat. No. 2,745,537 to Cadman et al.

SUMMARY OF THE INVENTION

The present invention is embodied in apparatus and related methods for receiving and feeding large quantities of container crowns or similar articles at high controllable through-put rates. In a preferred form, the apparatus comprises a generally circular table having a fence about its periphery with an opening in the fence. Means are provided for feeding quantities of container crowns onto the table and for rotating the table so that the crowns are moved outwardly against the fence and fed centrifugally out of the opening. A twist chute is provided at the opening for receiving the container crowns through the opening, the chute having at least two output tubes each of which is dimensioned to receive container crowns oriented in one or the other direction, and are further arranged to orient all of the container crowns in the same direction. Typically, because of the movement across the surface of the circular table and along the periphery of the fence, one of the tubes will have a container crown output which is substantially greater than the output of the second tube. In accordance with the preferred embodiment, there is provided a first and second curved channels coupled for conveying container crowns out of the respective first and second tubes of the twist chute, the first curved channel coupled for conveying container crowns out of the output tube having a greater output. The second channel merges together with the first channel at a merging point along the respective paths, with the path length of the first channel being substantially longer than that of the second channel between the twist tubes and the merging point.

The present invention further contemplates a number of structural and process features which facilitate the desired high through-put rates for container crowns handled by the apparatus and the associated methods, while achieving a smooth, controllable movement of the container crowns. Among those are the additional features discussed next.

First, the apparatus is provided with an escapement assembly adjacent the merging point for facilitating movement of the container crowns out of both the first and second channels and into an output channel extending vertically downward from the escapement assembly. The escapement assembly is provided with means for controlling its rotation rate, and further includes a rotating wheel at the merging point with first and second coaxial plates, one of which is smaller than the other and with the container crowns passing tangentially across the periphery of the smaller plate. The second plate includes means, such as spaced magnetic disks, for controlling the flow of container crowns into the output channel.

Second, the apparatus is provided with means for selectively interdicting the movement of container crowns through the opening in the fence, and for continuing the rotation of the table during periods when the flow of container crowns is interdicted. To control the selective interdicting means, the apparatus is provided with sensors along the channels which generates an output when a predetermined condition of crowns in the channel is sensed, and for selectively operating the interdicting means responsive to that output. By way of example, the sensor may detect when the first channel is full of container crowns, thereby interdicting movement of container crowns through the opening, while permitting the rotation of the table to continue.

Third, the apparatus is provided with a rotatable wheel at the opening to prevent the jamming of container crowns passing through the opening in the fence. A similar rotatable wheel is positioned opposite the escapement assembly at the merge point to further facilitate movement out of the first and second channels and into the output channel.

Fourth: the apparatus is further provided with a solenoid-actuated interrupter along both of the first and second channels, for selectively interdicting the movement of container crowns in each of the channels prior to passage across the exit point. The interrupter mechanism works in conjunction with an upstream sensor in the second channel for determining when the interrupters should be selectively operated to interdict container crown movement in either the first or second channel.

Fifth, the construction of the feeding apparatus is such as to facilitate the rapid clearing of jams that occur during operation, as well as the easy maintenance of the equipment. To this end, the output of the twist chute is directed generally horizontally, with the first and second channels defined by a generally vertical backplate, a segmented cover plate having a transparent portion and which is spaced from and extends generally parallel to the backplate and rail means between the backplate and the cover plate. The backplate, cover plate and rail means define two longitudinal channels each of which are coupled to the horizontal output of one of the twist tube outputs, so that the two longitudinal channels extend through a first horizontal portion, then downwardly through a second, generally vertically curved portion and then through a third, generally horizontal portion underneath the twist chute. It will be understood that each longitudinal channel is dimensioned to receive the container crowns passing therethrough. Preferably, the segmented cover plate is provided with longitudinal slots extending along each of the first, second and third sections, the slots permitting the inspection of the container crowns moving along the two longitudinal channels. Each cover plate portion is joined to the backplate and rail means by quick release fasteners.

Other features of the present invention which define improvements with respect to the prior art will be understood with reference to the accompanying drawings, described next.

THE DRAWING

FIGS. 1 and 2 are side and bottom views, respectively, of a typical container crown of the type which is to be handled by the apparatus and method of the present invention.

FIG. 5 is a side view of a portion of the centrifugal table shown in FIGS. 3 and 4.

FIG. 7 is a cross-sectional view of the track assembly of FIG. 6, taken along the line 7—7.

FIG. 8 is a cross-sectional view of the track assembly shown in FIG. 6, taken along the lines 8—8.

DETAILED DESCRIPTION OF THE PREFERRED EMBODIMENT

Figure 3:
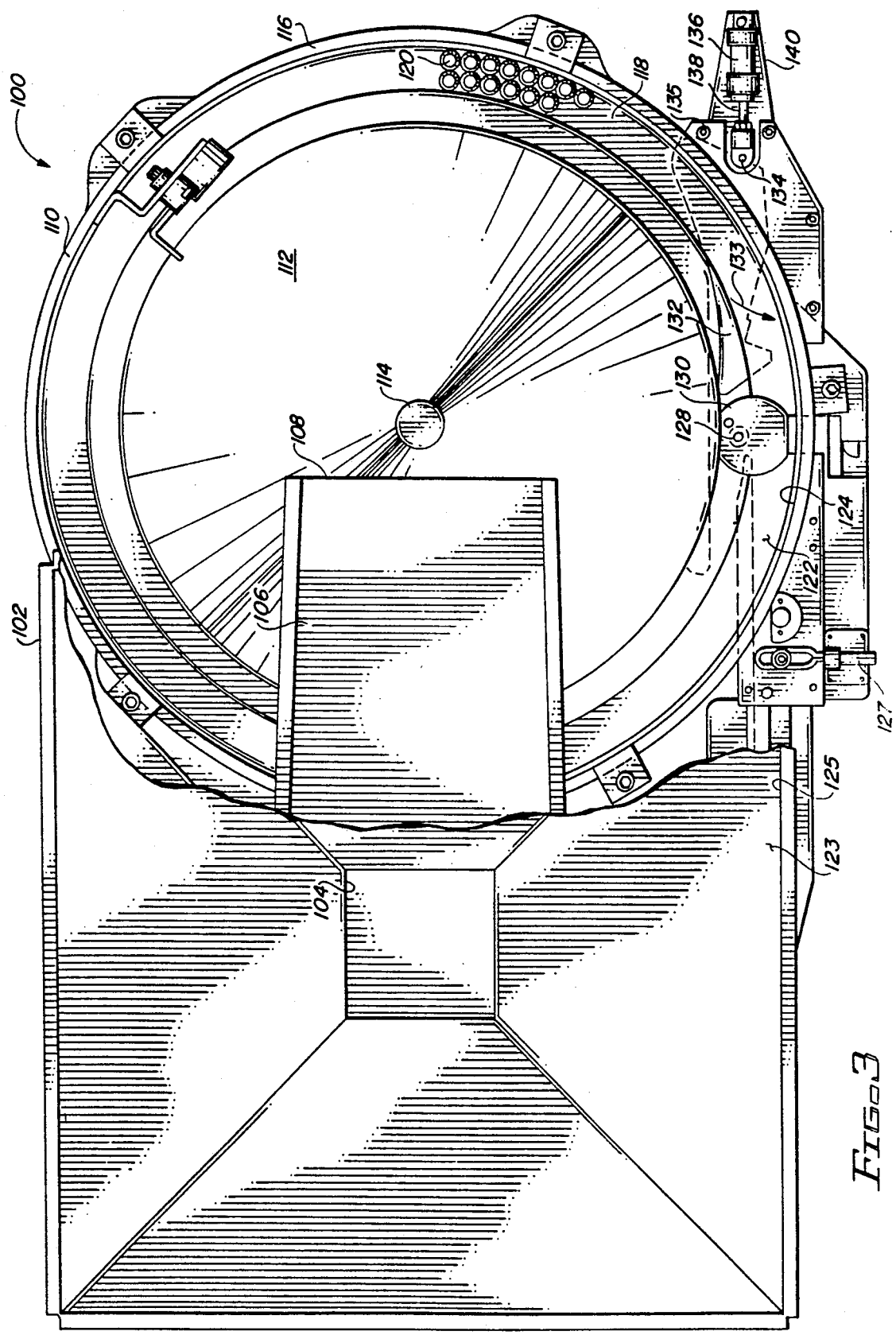
FIG. 3 is a top plan view of a hopper, conveyor feed and centrifugal table assembly in accordance with the present invention.

A container crown of the type to be handled by the apparatus and method of the present invention is shown in FIGS. 1 and 2. The container crown, referred to generally by the reference numeral 10, is fabricated from a metal disk 12 and initially stamped in a configuration which defines a flat top surface 14, an outwardly bevelled side surface 16 and a bottom peripheral edge 18. Typically, in the initial stamping process the container crown is provided with corrugations 20, so as to permit the easy folding of the bottom peripheral edge 18 underneath a glass bead of a pressurized container. It will of course be appreciated by those skilled in the art that the unusual cross-sectional configuration of the container crown 10 and the corrugations 20 make such articles very difficult to feed and control in automatic machinery at high through-put rates.

A preferred embodiment of an apparatus for efficiently feeding container crowns like that shown in FIGS. 1 and 2 at high through-put rates, e.g., on the order of about 3,000 crowns per minute, with a minimum of jamming is described next with reference to FIGS. 3-9. The apparatus includes several assemblies, including a hopper, conveyor and centrifugal table assembly referred to in FIGS. 3 and 4 generally by the reference numeral 100; and a conveyor track assembly and an escapement assembly, referred to respectively by the numerals 200 and 270 in FIGS. 6-9.

Figure 4:
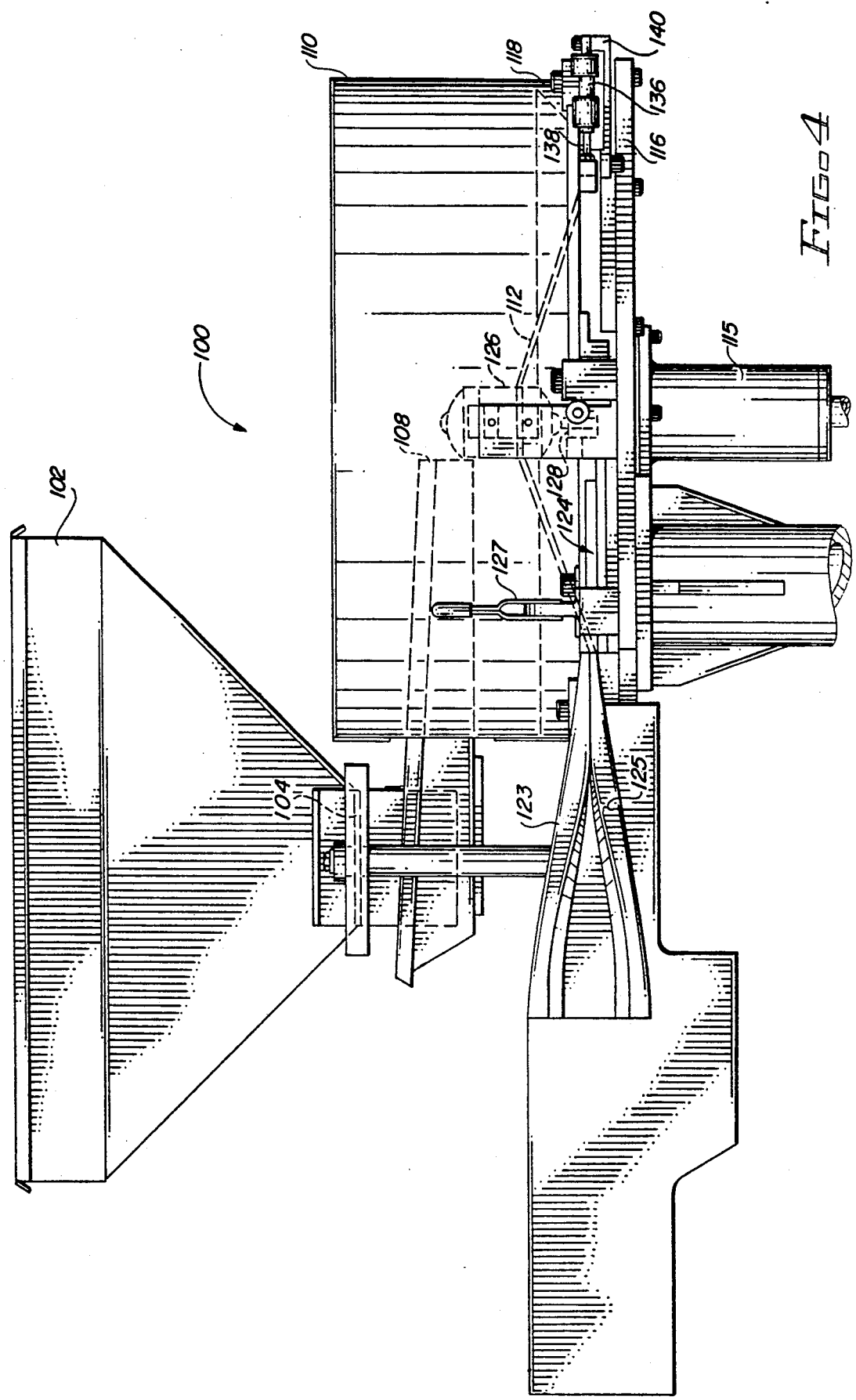
FIG. 4 is a side view of the hopper, conveyor and centrifugal table assembly shown in FIG. 3.

Referring first to FIGS. 3-5, the hopper, conveyor and centrifugal table assembly 100 includes a hopper 102 having a feed opening 104 which is controlled by a motor driven by shaft 105 to deposit container crowns onto conveyor 106. The conveyor 106 may either be agitated, or permit gravity feed out of its extremity 108, so that the container crowns are directed onto the surface 112 of a centrifugal table 110. As shown in FIG. 4, the surface 112 is slightly bevelled downwardly from the center of the table 110 to a relatively flat outer portion 113 and then to a fence 116 having an inside surface 120 defining the inner periphery of the table. There is provided an inwardly extending member 118 spaced above the horizontally flat portion of the table surface 112 a dimension approximately equal to the dimension between the top surface 14 and the bottom peripheral edge of the container crown 10. Thus, in operation, the rotation of the surface 112 of the centrifugal table 110 directs container crowns 10 downwardly along the bevelled portion of the surface 112, across the horizontally flat portion 112 and underneath the member 118, as is shown by container crowns 10 along the right hand side of the table surface in FIG. 3. However, it will be appreciated that the container crowns 10 are not completely oriented, and some of the container crowns are positioned along the flat portion 113 of the table surface 112 with the top surface 14 facing upwardly, while other container crowns 10 have the bevelled edge 18 facing upwardly. Therefore, it is necessary to provide means for orienting all of the container crowns 10 all in the same direction.

To this end, the table assembly 100 is provided with a rail 121 and a center rail 123 which defines a pair of channels 122, 124. Each of the channels 122, 124 are specifically dimensioned to receive one of the other (but not both) of the container crowns 10 oriented in a specific direction, i.e., with the top surface 14 upwardly, or alternatively with the bevelled edge 18 faced upwardly.

Further in accordance with the present invention, the table assembly 100 is provided with a gate 132 attached at a pivot point 135, and which is also attached to a hydraulic piston at pivot point 134. The piston 138 is operated by hydraulic cylinder 136, which in turn is attached to bracket 140. As will be understood, the movement of the piston 138 back and forth controls the gate 132 inwardly and outwardly as shown by arrow 133; this movement can be controlled by a manual electrical switch at an operator's position (not shown). In this way, the gate 132 is used to interdict the flow of container crowns 10 into the channels 122 and 124. The table assembly 110 is also provided with a rotating wheel and drive mechanism adjacent the mouth of the channels 122, 124 to facilitate movement of container crowns 10 into the channels 122, 124. This mechanism is best understood with reference to FIG. 5, and includes a motor 130 which drives a rotating wheel 128. The wheel 128 rotates in a counterclockwise direction, and serves to eject any container crown between the member 118 and the flat portion 113 of the table surface 112.

Referring now to the left hand portions of FIGS. 3 and 4, the table assembly 100 is provided with a conventional twist tube defined by twist tube channels 123 and 125, each of which is respectively coupled to the input channels 122, 124 of the opening along the periphery 120 of the fence 110. Twist tubes of the type shown as elements 123 and 125 in FIGS. 3 and 4 are well known in the art, and are not described in great detail here. The twist tubes 123, 125 have opposing orientations, such that the container crowns 10 existing the two twist chutes are all oriented in the same direction, preferably with the top flat surface 14 and the peripheral edge 18 oriented in vertical planes. The twist chutes 123, 126 are removably attached to the table assembly via a clamp mechanism 127.

In accordance with the preferred embodiment of the apparatus, the table assembly 100 includes means for interdicting the flow of container crowns 10 into the two channels 122, 124 even while the surface 112 of the table 100 continues to operate and move container crowns to the outside periphery of the table. To this end, the table 100 is provided with a gate 132 having a distal end which extends across the flat portion 113 of the surface of the table 100, and which is attached at its proximal end to a pivot 135. As shown in FIG. 3, the gate 132 is positioned to move into and out of the path of container crowns 10 moving about the periphery 120 of the table 110, as is noted by arrow 133. In order to move the distal end of the gate 132 into and out of the openings 122, 124, the table assembly 100 includes a pressure-actuated cylinder 136 mounted upon a plate 140 along the outside periphery of the table 110. The cylinder 136 includes a piston 138 the end of which is attached to the gate at 134, in order to move the distal end of the gate 132 in the manner described above. Operation of the pressure cylinder 136 is controlled by sensors along the track assembly, described below with respect to FIGS. 6-9.

Figure 6B:
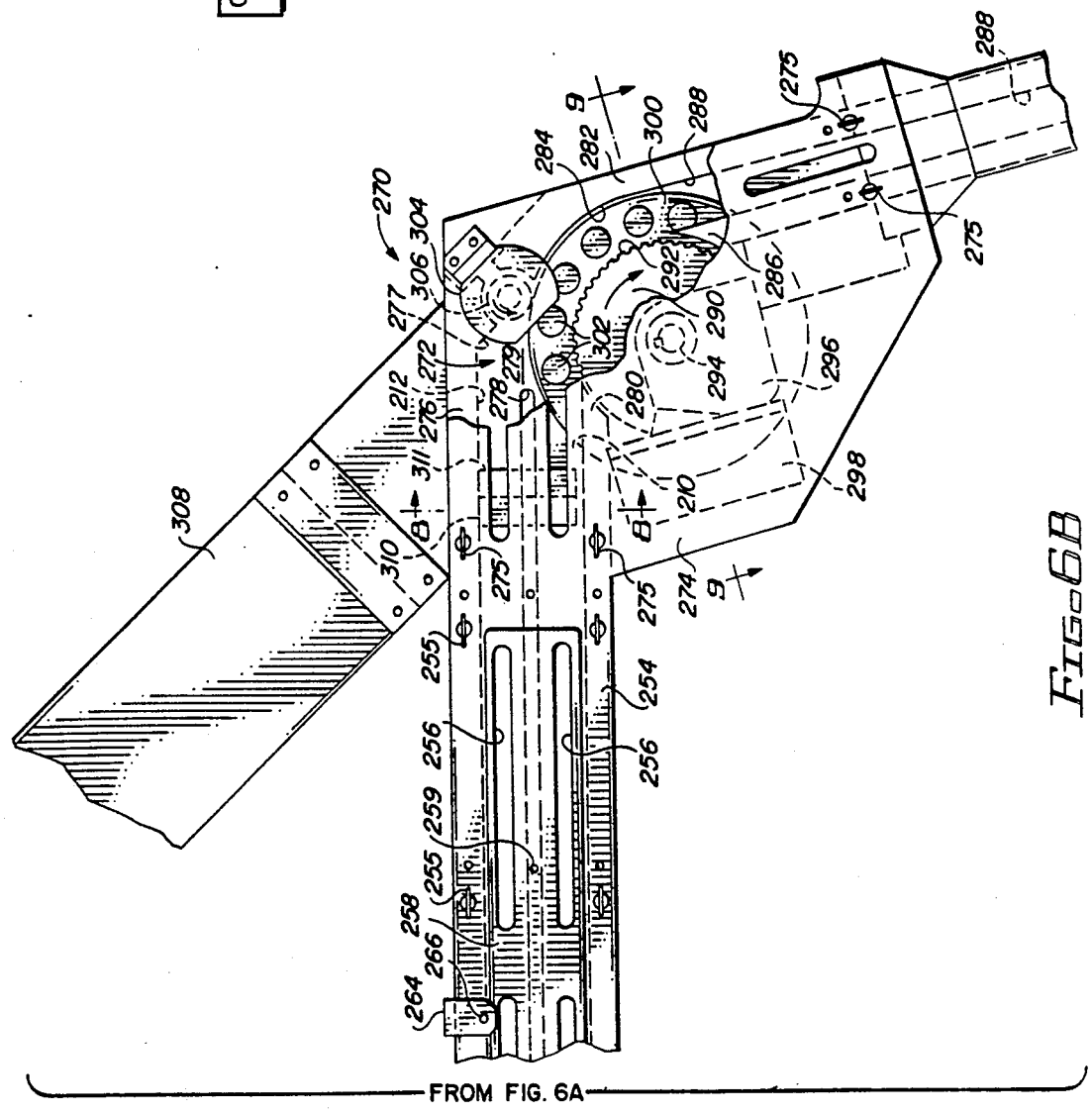
FIG. 6 is a side view of the track and escapement assemblies for apparatus in accordance with the present invention.

Referring first to FIG. 6, the track assembly is referred to generally by the reference numeral 200 and the escapement assembly is referred to generally by the reference numeral 270.

The track assembly 200 includes a first, generally vertical backplate 202 and a cover plate 214 spaced from and generally parallel with the backplate 206. Three rail members 204, 206 and 208 define two channels 210, 212 which extend longitudinally from a forward, receiving end of the track assembly 200 which are respectively in communication with the twist chutes 123 and 125 of the table assembly 100. As shown in the cross-sections of FIGS. 7 and 8, the channels 210, 212 are defined by bevelled end surfaces 211 which include an intermediate riser for engaging an uncorrugated portion of the crowns 10.

Referring again to FIG. 6, the backplate 202, the cover plate 214 and the rail members 204, 206 and 208 are all removably joined together with fasteners, including quickrelease fasteners 215 which attach the cover plate 214 to the top and bottom rail members 204 and 208. A portion of the cover plate 214 comprises a transparent plate 218 which include longitudinal slots 216 extending along the transparent portion 218. The transparent portion 218 is attached to the center rail member 206 via fasteners 219.

It will thus be understood that container crowns 10 flowing from the twist chutes 123 and 125 enter the respective channels 210 and 212 in the first track portion.

The track assembly 200 further comprises a second, generally vertically curved portion attached to the first, horizontal portion, the second portion including a curved backplate 222, a corresponding cover plate 234, rail members 224, 226 and 228 which are joined together with fasteners, including quick-release fasteners 235. The cover plate 234 includes a transparent portion 238 having curved longitudinal slots 236 and which transparent portion 238 is attached to the center rail member 226 via fasteners 239. As is shown in the second track portion in FIG. 6, it is preferred that the first and second channels 210, 212 extending along the second track portion come together slightly by diminishing the dimension of the center rail member 226, in order to facilitate the merging of the container crowns passing along the first and second channels 210, 212 at the merge point 279, as discussed, in further detail below.

The track assembly 200 further includes a third, generally horizontal portion which extends underneath the twist chutes 123, 125 and which is formed from a generally vertical backplate 242, a front cover 254, rail members 244, 246 and 248 which are joined together by fasteners including quick release fasteners 255. The plate member 254 includes a transparent portion 258 having longitudinal slots 256 therein and which is joined to the center rail via fasteners 259.

As thus shown in FIG. 6 and described above, the track assembly 200 extends through a horizontal portion coupled to the output of the twist chutes 123, 125, and which then curves vertically downwardly and back underneath the twist chute apparatus to the escapement assembly 270. The track assembly 200 further includes a pair of sensors 262 mounted upon respective brackets 260 and which are used to detect the movement of container crowns 10 through one of the longitudinal channels 210. A similar sensor 266 is positioned on bracket 264 along the third portion of the track assembly.

Suitably, the track assembly 200 further includes a pair of air nozzles 268 which are mounted at an extremity of longitudinal slots 216 in the first portion of the track assembly 200, and through which air is passed under pressure in order to facilitate the movement of container crowns 10 along the longitudinal channels 210, 212.

A cross section of the third track portion is shown in FIG. 7.

Figure 9:
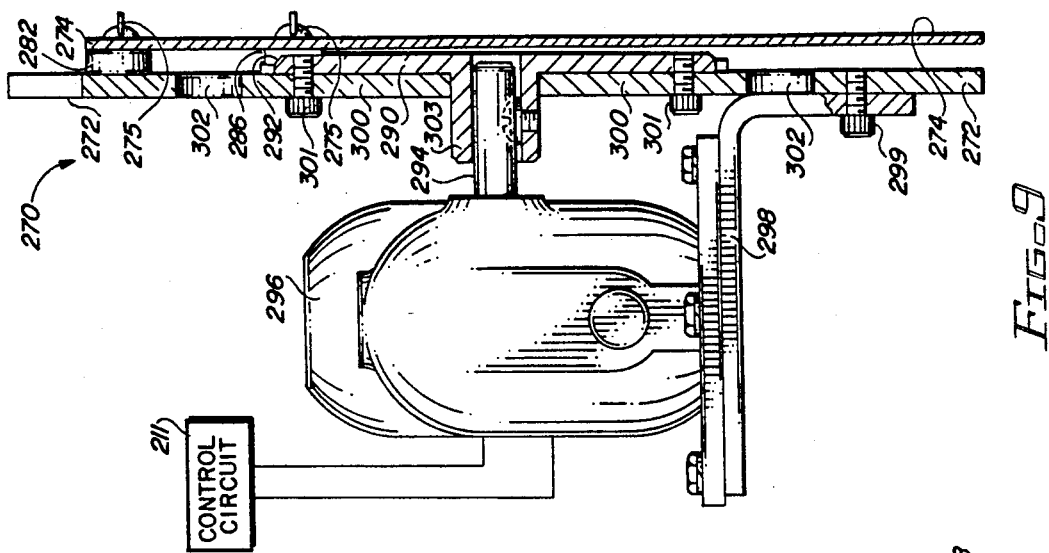
FIG. 9 is a cross-sectional view of the escapement assembly shown in FIG. 6, taken along the line 9—9.

Turning now to the bottom right hand portion of FIG. 6 and the cross sectional views of FIGS. 8 and 9, the escapement assembly 270 includes a vertical backplate 272, a front plate 274 and rail members 276, 278 and 280, which are all joined together with fasteners, including quick-release fasteners 275. As shown in FIG. 6, the rail member 276 includes a downward bevel 277, the center rail member 278 terminates at a merge point 279, and the lower rail member 280 terminates tangentially to an escapement assembly wheel 290, described in greater detail below. Thus configured, the rail members permit the container crowns 10 passing along longitudinal channels 210 and 212 to come together at the merging point 279.

The escapement assembly 270 also includes a pair of output rails 282 and 286, the second rail 286 extending tangentially to the periphery of the escapement wheel 290, and both output rails 282 and 286 extending generally vertically, as shown in FIG. 6. The cover plate 274 extends across the rail members 286 and 288, and is releasably joined to the rails by fasteners 275. As shown in FIG. 6, the first output rail 282 forms a curved radius 284 about the outer periphery of a second wheel 300 attached with the first escapement wheel 290. The first and second output rails 282, 286 form an output channel 288 dimensioned to receive the container crowns.

As noted above, the escapement assembly 270 includes a pair of concentric wheels 290, 300 which are shown in side view in FIG. 6 and in cross section in FIG. 9. The two wheels 290, 300 are attached together by fasteners 301, the inner wheel 290 having a central collar 303 dimensioned to receive a shaft 294 of a motor 296. The motor 296 is coupled to an electric circuit 297, which can be controlled by the operator to increase or decrease the rotation rate of the escapement assembly. The motor 296 is supported by a bracket 298 which is attached to the backplate 272 by a fastener 299. As shown in the broken away portion of FIG. 6, the first wheel 290 includes serrations 292 along its periphery, and the second wheel 300 includes magnetic disks 302 embedded across the surface between the periphery of the first wheel 290 and the outer periphery of the wheel 300.

Referring again to FIG. 6, the escapement assembly 270 also includes a drive wheel 306 the periphery of which extends tangentially to the periphery of the second escapement wheel 300. The wheel 306 is driven by a motor 304 so that the wheel 306 is driven in a direction of rotation opposite to that of the second escapement wheel 300, in order to urge container crowns at the merging point 279 downward through the gap along the surface of the second escapement wheel 300 (and across the magnetic disk 302), the gap being between the periphery of the wheel 306 and the first escapement wheel 290.

As noted with reference to both FIG. 6 and the cross section of FIG. 8, the escapement assembly 270 also includes a solenoid 314 mounted on a bracket 310 by fasteners 312. The solenoid 314 includes an interrupter piston 318 which is directed the longitudinal channel 210 to stop the flow of container crowns 10 along the channel 210. Similarly, another solenoid interrupter piston assembly 311 is mounted next to the bracket 310 for interrupting crown flow through the other channel 212.

In operation, container crowns 10 passing out of the twist chutes 123 and 125 pass into the longitudinal channels 210 and 212. As is known, the nature of the container crowns 10 is such that a much larger number of the crowns will be oriented in one direction across the surface of the table assembly 100 than in the opposing direction; and as noted above, the twist chutes 123, 125 are also oriented so that the higher volume of container crowns 10 passes into the longitudinal channel connected to that twist chute which receives the higher volume, namely twist chute 123. Thus, the larger output of twist chute 123 passes along a greater curved dimension through longitudinal channel 210, and the smaller output along channel 212. In normal operation, the container crowns 10 in the longer channel 210 pass across the periphery of the wheel 290 and exit out of rails 282, 286. During that time, the interrupter piston in assembly 311 prevents the flow of crowns 10 out of the second channel 212. When the second channel 212 is filled with crowns 10 to the point of sensor 266, the first interrupter piston 316 is operated to interrupt the flow of crowns 10 through channel 210, while flow is then permitted in the second channel 212 for a brief period to clear that channel of crowns.

Movement of the container crowns 10 through the channels 210, 212 is facilitated by the air nozzles, such as nozzles 268 in FIG. 6. In the event that a backup of container crowns 10 is detected at sensors 268, then conventional electronics are used to provide an output which operates gate 132 to a closed position; however, during the period in which the gate 132 is closed, the centrifugal table assembly 100 continues to rotate the surface 112, thereby maintaining a quantity of container crowns 10 along the periphery 120 of the table assembly 100 for immediate feed into the twist chute openings 122, 124 after the gate 132 is again opened, as determined by an output from sensor 266 along the third portion of the curved track assembly.

This concludes the description of the preferred embodiments. A reading by those skilled in the art will bring to mind various changes without departing from the spirit and scope of the invention. It is intended, however, that the invention only be limited by the following appended claims.

What is claimed is:

1. Apparatus for receiving and feeding large quantities of container crowns or similar articles at a high through-put rate, the apparatus comprising:
   a generally circular table having a fence about its periphery with an opening in the fence;
   means for feeding quantities of container crowns onto the table;
   means for rotating the table so that container crowns on the table are moved outwardly against the fence and fed centrifugally out of the opening;
   a twist chute at the opening for receiving the container crowns through the opening, the twist chute having at least two output tubes, each tube dimensioned to receive container crowns oriented in one direction, the two output tubes arranged to orient all of the container crowns in the same direction, a first one of the tubes having a container crown output of substantially greater quantity than the second one of the output tubes;
   a first curved channel coupled for conveying container crowns out of the first output tube;
   a second curved channel coupled for conveying container crowns out of the second output tube;
   the second curved channel merging together with the first channel at a point along their respective paths; and wherein
   the path length of the first channel is substantially longer than that of the second channel between the output tubes and the merging point.

2. The apparatus recited in claim further comprising an escapement assembly adjacent the merging point for controlling the rate of movement of the container crowns out of both the first and second curved channels.

3. The apparatus recited in claim 2 further comprising means adjacent the escapement assembly for interrupting the flow of container crowns in at least the second channel.

4. The apparatus recited in claim 2 wherein the escapement assembly is located at the merging point.

5. The apparatus recited in claim 4 wherein the escapement assembly comprises:
   a wheel with the merging point along the periphery of the wheel; and
   means for controllably rotating the wheel.

6. The apparatus recited in claim 5 wherein the wheel is positioned vertically above the merging point, and wherein the rotating means includes means for rotating the wheel at a speed determined by an operator.

7. The apparatus recited in claim 5 wherein the wheel is positioned vertically below the merging point, and wherein the rotating means rotates the wheel clockwise.

8. The apparatus recited in claim 2 wherein the escapement assembly comprises:
- a first rotatable circular plate positioned along the first channel, with the first channel extending alongside the periphery of the first plate; and
- a second circular plate fixed coaxially and rotatable with the first plate and positioned so that the container crowns moving along the first channel pass tangential to the periphery of the second plate, the second plate having means along its periphery for urging container crowns along the first channel.

9. The apparatus recited in claim 8 wherein the first plate includes means spaced outside of the second plate for urging container crowns along the first channel.

10. Apparatus as recited in claim 9 wherein container crowns comprise a ferrous metal, and wherein the first plate urging means comprises plural magnets spaced about the periphery of the first plate.

11. The apparatus recited in claim 9 further comprising means downstream of the second plate along the first channel for preventing rotational movement of container crowns along the surface of the first plate.

12. The apparatus recited in claim 8 wherein the output of the second channel is dimensioned to feed crowns tangential to the second plate.

13. The apparatus recited in claim 12 wherein the tangential direction of the second channel is generally perpendicular to the tangential direction of the first channel, each tangential direction being with respect to the second plate of the escapement assembly.

14. The apparatus recited in claim 13 wherein the second plate is vertically above the first channel.

15. The apparatus recited in claim 12 wherein the tangential direction of the second channel is generally parallel to the tangential direction of the first channel, each tangential direction with respect to the second plate of the escapement assembly.

16. The apparatus recited in claim 15 wherein the second plate is vertically below the first and second channels.

17. The apparatus recited in claim 1 further comprising:
- means for selectively interdicting the movement of container crowns through the opening in the fence; and
- means for continuing the rotation of the table during periods when the flow of container crowns through the opening is interdicted.

18. The apparatus recited in claim 17 wherein the twist chute comprises an entryway at the fence opening, and wherein the interdicting means comprises a gate selectively movable into and out of the opening.

19. The apparatus recited in claim 18 wherein the entryway has an outside surface extending generally tangentially to the periphery of the table and an inside surface spaced from the outside surface a dimension which permits the passage of container crowns between the inside and outside surfaces, the apparatus further comprising a small rotatable wheel at the extremity of the inside surface and means for rotating the wheel to prevent jamming of container crowns passing through the entryway.

20. The apparatus recited in claim 19 wherein the small wheel rotating means comprises means for rotating the wheel in a direction opposing the movement of container crowns into the entryway.

21. The apparatus recited in claim 17 further comprising sensor means along one of the channels for providing an output when a predetermined condition of crowns in the channel is sensed, and means for operating the selective interdicting means responsive to the sensor output.

22. The apparatus recited in claim 1, wherein each channel is defined by an edge surface having an intermediate riser for engaging container crowns away from any corrugations on the crowns.

23. The apparatus recited in claim 1, further comprising:
- means for selectively interdicting the movement of the crowns through the opening in the fence;
- means for continuing the rotation of the table during periods when the flow of crowns through the opening is interdicted, the interdicting means comprising a gate selectively movable into and out of the opening.

24. The apparatus recited in claim 23 further comprising a small rotatable wheel at the opening, and means for rotating the wheel in a direction opposing the movement of the crowns out of the opening to prevent jamming of articles at the opening.

25. The apparatus recited in claim 1 wherein the first and second channels extend generally concentrically each with respect to the other.

26. The apparatus recited in claim 1 further comprising:
- an output channel positioned down stream from the merging point; and
- means for passing crowns out of the merging point and into the output channel.

27. The apparatus recited in claim 26 wherein the output channels extends in a different direction than the first and second channels, the apparatus further comprising means for facilitating crown movement along the different direction.

28. The apparatus recited in claim 1 wherein the first and second channels comprise:
- a backplate;
- a cover plate extending generally parallel with and spaced from the backplate;
- spacer means between the backplate and the cover plate; and wherein
- the backplate, the cover plate and the spacer means define a longitudinal channel for each of the first and second channels, each channel dimensioned to receive the crowns passing from the output means.

29. The method recited in claim 28 wherein the backplate and cover plate lie in a generally vertical plane.

30. The apparatus recited in claim 28 wherein the cover plate includes elongated access slots extending generally parallel with the longitudinal direction of the corresponding channel.

31. The apparatus recited in claim 30 wherein the cover plate is defined by multiple segments along the length of both channels.

32. The apparatus recited in claim 31 wherein each cover plate segment is removably fastened with the backplate and spacer means.

33. The apparatus recited in claim 32 wherein some of the cover plate segments are transparent.

34. The apparatus recited in claim 28 further comprising means for injecting a fluid into the channels for facilitating movement of the articles along the channels.

35. The apparatus recited in claim 34 further comprising a bracket fixed to the backplate, and wherein the fluid injecting means comprises air nozzles each communicating with one of the channels.

36. Apparatus for receiving and feeding large quantities of container crowns of the type defined by flat top surface and an outwardly beveled side surface extending to a bottom peripheral edge, the apparatus comprising:

a generally circular horizontal table surface having a fence about its periphery;

means for feeding quantities of container crowns onto the table surface;

means for rotating the table surface so that the container crowns thereon are moved outwardly against the fence;

the fence having an opening along its periphery for receiving container crowns oriented with either the top surface or the bottom peripheral edge lying on the table surface, the opening having a pair of slots each for receiving container crowns of one or the other orientation;

a twist chute having two tubes, each tube coupled to receive container crowns passing out of one of the slots and both tubes dimensioned and disposed to orient all of the container crowns in the same direction with the top surface and peripheral edge extending generally vertically, and thereafter to pass the oriented crowns in a generally horizontal direction;

a generally vertical backplate, a segmented transparent cover plate spaced from and extending generally parallel to the backplate and spacer means between the backplate and the cover plate, the backplate, cover plate and spacer means defining two longitudinal channels each coupled to the horizontal output of one of the tubes so that the two longitudinal channels extend through a first horizontal portion, then downwardly through a second, generally vertically curved portion and then through a third, generally horizontal portion underneath the twist chute, each longitudinal channel having a cross-sectional shape corresponding to that of the container crowns passing therethrough; and the second longitudinal channel merging with the first channel at a merge point at the extremity of the third portions.

37. The apparatus recited in claim 36 further comprising brace means extending generally vertically from the third longitudinal channel portion to the area of the twist chute and the first longitudinal channel portion.

38. The apparatus recited in claim 36 further comprising an escapement assembly at the extremity of the third longitudinal channel portion at the merge point, and a single, generally vertically extending output longitudinal channel receiving container crowns at the merge point below the escapement assembly from both the first and second longitudinal channels.

39. A method for receiving and feeding large quantities of container crowns or similar articles at a high through-put rate, the method comprising the steps of:

providing a generally circular table having a fence about its periphery with an opening in the fence;

feeding quantities of container crowns on to the table;

rotating the table so that the container crowns are moved centrifugally outwardly against the fence and then are fed out of the opening;

receiving container crowns in a twist chute at the opening, the twist chute having at least two output tubes, each for receiving container crowns oriented in one direction, and arranging the two output tubes to orient all of the container crowns in the same direction, a first one of the tubes having a container crown output of substantially greater quantity than the output of the second tube;

conveying container crowns out of the first output tube and into a first, curved channel;

conveying container crowns out of the second output tube and into a second curved channel;

extending the first curved channel along a substantially greater path length than the path length of the second curved channel; and merging the first and second curved channels together at a point along their respective path lengths.

* * * * *